United States Patent [19]

Poisson et al.

[11] Patent Number: 4,721,583

[45] Date of Patent: Jan. 26, 1988

[54] FIRE-RESISTANT POLYCARBONATES

[75] Inventors: Pierre Poisson, Bernay; Philippe Potin, Billere, both of France

[73] Assignee: Atochem, France

[21] Appl. No.: 886,200

[22] Filed: Jul. 15, 1986

[30] Foreign Application Priority Data

Jul. 17, 1985 [FR] France ................ 85 10959

[51] Int. Cl.$^4$ .............. C09K 21/00; C08K 5/34; C08K 5/48
[52] U.S. Cl. ................ 252/609; 106/18.15; 106/18.17; 106/18.18; 106/18.21; 106/18.31; 106/18.32; 252/7; 252/602; 260/DIG. 24; 521/907; 524/89; 524/94
[58] Field of Search ............. 252/609, 7, 601, 602; 106/18.14, 18.15, 18.17, 18.18, 18.21, 18.31, 18.32; 524/89.87, 94, 611, 612; 525/146; 558/138, 144; 260/DIG. 24; 521/907

[56] References Cited

U.S. PATENT DOCUMENTS

| | | | |
|---|---|---|---|
| 3,253,063 | 5/1966 | Nielsen | 260/971 |
| 4,030,933 | 6/1977 | Conciatori et al. | 252/609 |
| 4,208,489 | 6/1980 | Schmidt et al. | 525/146 |
| 4,579,956 | 4/1986 | Redmore | 252/609 |
| 4,594,375 | 6/1986 | Krishnan et al. | 524/89 |

FOREIGN PATENT DOCUMENTS 1312211  4/1973  United Kingdom ........ 106/18.17

Primary Examiner—John F. Terapane
Assistant Examiner—Howard J. Locker
Attorney, Agent, or Firm—Sigalos & Levine

[57] ABSTRACT

A fire-resistant polycarbonate composition comprising a polycarbonate and for each one thousand parts by weight thereof from about 0.1 to 10 parts by weight of a salt of the formula:

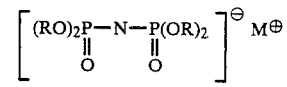

in which R is a $C_1$ to $C_6$ alkyl radical or an aryl radical, unsubstituted or substituted aryl radical and M is an alkali metal selected from Li, Na, or K.

4 Claims, No Drawings

FIRE-RESISTANT POLYCARBONATES

BACKGROUND OF THE INVENTION

Polycarbonates are already by themselves self-extinguishable materials. However, they are considered as being still too flammable for a number of applications concerning particularly the building industries, electric appliance industries, and aeronautic industries.

And so, to render them still more fire-resistant, numerous solutions have been proposed.

It is thus that halogenated products have alredy been utilized for this purpose, such as decabromodiphenylether, introduced in the form of an additive, or tetrabromobisphenol A, in the form of a polycondensation agent. However, one thus obtains materials which during their use or in fires are likely to liberate hydrochloric or hydrobromic acids which are particularly corrosive and toxic.

Certain derivatives of phosphorus were then proposed which do not present these drawbacks, such as the esters of phenyl acids or phosphonic xylenes halogenated on the ring. However, it is necessary to incorporate them at such amounts that the mechanical properties of the polycarbonate thus loaded and its ability for conversion are seriously affected. Likewise, the cost becomes prohibitive.

Other additives have also been proposed, such as the alkaline salts of alkyl or arylsulfonic acids, but the compositions obtained are generally translucid or opaque.

SUMMARY OF THE INVENTION

We have found, and this is the object of the present invention, that one could obtain compositions of transparent synthetic resins based on polycarbonates and, in particular, on polycarbonate derived from bisphenol A, presenting an improved behavior with respect to fire by incorporating into them a very slight amount of an alkaline salt of a tetraester of an imido diphosphoric acid.

This salt has the formula:

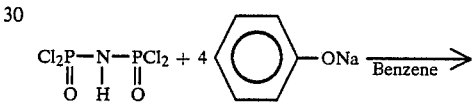

in which R is a $C_1$ to $C_6$ alkyl radical or an aryl radical, unsubstituted or substituted with at least one halogen such as chlorine or bromine, and M is an alkali metal atom selected from Li, Na, or K; and preferably K.

DETAILED DESCRIPTION

This salt must be incorporated at a concentration of between 0.1 and 10 per thousand parts by weight of polycarbonate, preferably between 0.3 and 0.5 parts per thousand parts by weight of polycarbonate.

Particularly suitable as a fire-retardant additive is the potassium salt of the tetraphenyl ester of imido diphosphoric acid (or potassium bis diphenoxy imidate) of the formula:

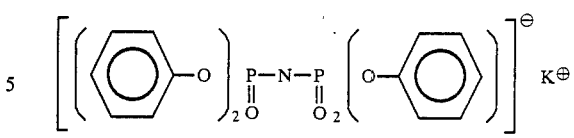

The latter salt is obtained by the addition of alcoholic KOH to an alcoholic solution of the tetraphenyl ester of imido diphosphoric acid (according to the reaction below) and evaporation of the ethyl alcohol.

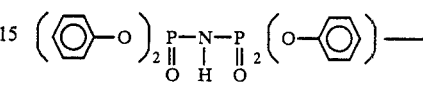

The tetraphenyl ester of imido diphosphoric acid can itself be easily obtained from the tetrachloride of imido diphosphoric acid according to the reaction:

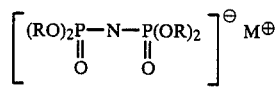

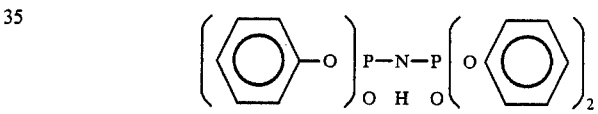

(Von Richter, E. Fluck, H. Riffel, and H. Hess—Z. anorg, allg. Chem. 496, 109–116—1983).

The polycarbonates which can be made fire resistant by the addition of such salts according to the invention can be selected from among the various aromatic polycarbonates or copolycarbonates deriving from one or several diphenols such as resorcinol, hydroquinone, dihydroxydiphenyl, bis(hydroxy-phenyl)alkanes, bis(-hydroxyphenyl)sulfones, bis(hydroxyphenyl)sulfoxides, 2,2'bis(hydroxyphenyl)diisopropylbenzens, and the alkylated derivatives on the ring of such diphenols.

In particular the polycarbonates or copolycarbonates can be selected from among those deriving from one or more bis phenols such as 2,2-bis(4-hydroxy phenyl)propane, 4,4'-dihydroxy diphenyl, 2,4-bis(4-hydroxy phenyl)-2-methyl butane, 1,1 bis(4-hydroxy phenyl)cyclohexane, 2,2'bis(4-hydroxy phenyl) p-diisopropylbenzene, 2,2-bis(3-methyl-4-hydroxy phenyl)propane, bis(3,5-dimethyl-4-hydroxy phenyl)methane, 2,2-bis(3,5-dimethyl-4-hydroxy phenyl)propane, bis(3,5-dimethyl-4-hydroxy phenyl)sulfone, 2,4-bis(3,5 dimethyl-4-hydroxy phenyl)-2-methyl butane, 1,1-bis(3,5 dimethyl-4-hydroxy phenyl)cyclohexane, and 2,2'-bis(3,5-dimethyl-4-hydroxy phenyl) p-diisopropylbenzene.

The preferred polycarbonates and copolycarbonates are those which derive from one or several bisphenols selected from among 2,2-bis(4-hydroxy phenyl)propane; also called bisphenol A, 2,2-bis(3,5 dimethyl-4- hydroxy phenyl)propane, and 1,1-bis(4-hydroxy phenyl)cyclohexane.

These aromatic polycarbonates, which can be prepared by the well-known transesterification procedures in molten medium between the selected diphenol or diphenols and diphenyl carbonate or by the well-known interfacial reaction procedures between the desired diphenol or diphenols and phosgene, generally are thermoplastic and possess viscosimetric molecular masses which, calculated from their viscosity in solution are between 15,000 and 60,000 and preferably are located between 20,000 and 40,000.

In addition to the fire-retardant additive, the polycarbonate compositions can likewise contain other additives such as pigments, dyestuffs, stabilizers with respect to ultraviolet rays, unmolding agents, stabilizers with respect to thermal degradation and fillers. Said compositions can likewise contain glass fibers, especially in proportions of from about 10 to 35% by weight of the polycarbonate, for the purpose of improving the rigidity of the thermoplastic polycarbonate resin. One can likewise add to them agents which diminish fracturing such as polysiloxanes or polytetrafluoroethylenes, and in particular polytetrafluoroethylenes in the form of a white powder obtained by the polymerization of tetrafluoroethylene in aqueous emulsion and possessing molecular masses by weight of between $10^5$ and $10^6$.

The incorporation of the fire-resistant salt of the invention is done by mixing it into the polycarbonate in the molten state. Any mixing apparatus ensuring a good dispersion (such as a single-screw or double-screw extruder, Buss mixer and the like) can thus be suitable.

The most practical method consists of mixing in the dry state, for instance, in a drum, the granules of polycarbonate and the fire-retardant salt and to feed the mixture thus obtained by means of a hopper into an extruder. The strands which leave the extruder, equipped with a multi-hole die, in the molten state, are cooled by passage through a water bath and cut into granules.

The test specimens destined to be utilized for the standardized combustion tests will be obtained by injection molding of the granules obtained above, after suitable drying, the injection temperatures being of the order of 280° to 320° C.

Among the various tests existing to evaluate the behavior of the polymers with respect to fire, two combustion tests, considered to be particularly significant, were selected to determine the behavior of the polycarbonate compositions according to the invention; namely, the test for the determination of the Limiting Oxygen Index (L.O.I.) defined in ASTM Standard D 2863, and the combustion test UL94 described in Bulletin 94 of Underwriters' Laboratories.

The invention will be further described in connection with the following examples which are set forth for purposes of illustration only.

EXAMPLES 1 TO 4

The examples which are summarized in the table below were carried out on a commercial polycarbonate, obtained by interfacial reaction between phosgene and bisphenol A and having a molecular mass of 25,000.

Different amounts of potassium bis diphenoxy imidate (PBDI) obtained as indicated above were incorporated into this polycarbonate; the granules obtained served to mold test specimens in the shape of parallelepipedal rectangles of 3.2 mm of thickness on which the standardized flammability tests were carried out.

The absolutely remarkable transparency, one of the very big advantages of the invention, can be verified by means of a Gardner Hazemeter, type XL211, according to ASTM Standard D 1003-62.

The results are set forth in the chart that follows:

| Example | Composition Parts Per Thousand | | Oxygen Index (in %) | Average Combustion (in sec) | Drops Igniting the | Classification UL94 3.2 mm | Transparency of Sample Specimen |
|---|---|---|---|---|---|---|---|
| | Polycarbonate | PBDI | | | | | |
| 1 (Control) | 1000 | 0 | 27.5 | 14.4 | numerous | V2 | Yes |
| 2 | 1000 | 0.1 | 28 | 3.4 | 1 per test specimen | V2 | Yes |
| 3 | 1000 | 0.3 | 29.5 | 2.4 | 1 per test specimen | V2 | Yes |
| 4 | 1000 | 0.5 | 31.5 | 2.4 | 1 per test specimen | V2 | Yes |

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A fire-resistant polycarbonate composition comprising a polycarbonate and for each one thousand parts by weight thereof from about 0.1 to 10 parts by weight of a salt of the formula:

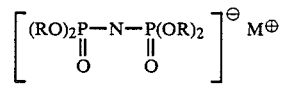

in which R is a $C_1$ to $C_6$ alkyl radical or an aryl radical, unsubstituted or substituted aryl radical and M is an alkali metal selected from Li, Na, or K.

2. The composition of claim 1, wherein M is potassium and the salt is present in an amount of from about 0.3 to 0.5 parts by weight.

3. The composition of claim 2, wherein the salt is potassium bis-diphenoxy imidate.

4. The composition of claim 1, 2, or 3, wherein the polycarbonate is a polycarbonate or copolycarbonate based on at least one bisphenol selected from 2,2-bis(4-hydroxyphenyl)propane, 2,2-bis(3,5 dimethyl-4-hydroxyphenyl)propane, or 1,1-bis(4 hydroxyphenyl)-cyclohexane.

* * * * *

UNITED STATES PATENT AND TRADEMARK OFFICE
CERTIFICATE OF CORRECTION

PATENT NO. : 4,721,583

DATED : Jan. 26, 1988

INVENTOR(S) : POISSON ET AL.

It is certified that error appears in the above-identified patent and that said Letters Patent are hereby corrected as shown below:

Column 2, the formula appearing in lines 35 to 39, the bonding between the P to the O and the N to the H has been omitted as has the bonding of the oxygen to the benzene.

Column 4, the chart spanning lines 23 to 45, the heading of the sixth column in this chart which now reads "Drops Igniting the", after the word "the", add the word --Cotton--.

Signed and Sealed this

Sixth Day of September, 1988

Attest:

DONALD J. QUIGG

Attesting Officer

Commissioner of Patents and Trademarks